US 6,738,622 B1

(12) United States Patent
Stadelmann et al.

(10) Patent No.: US 6,738,622 B1
(45) Date of Patent: May 18, 2004

(54) ROAMING METHOD AND DEVICES APPROPRIATE THEREFOR

(75) Inventors: Anton N. Stadelmann, Bolligen (CH); Werner Hirzel, Niederscherli (CH); Walter Heutschi, Jegenstorf (CH)

(73) Assignee: Swisscom AG, Bern (CH)

( * ) Notice: Subject to any disclaimer, the term of this patent is extended or adjusted under 35 U.S.C. 154(b) by 0 days.

(21) Appl. No.: 09/446,017

(22) PCT Filed: Mar. 29, 1999

(86) PCT No.: PCT/CH99/00130
§ 371 (c)(1),
(2), (4) Date: Dec. 16, 1999

(87) PCT Pub. No.: WO99/55107
PCT Pub. Date: Oct. 28, 1999

(30) Foreign Application Priority Data

Apr. 17, 1998 (CH) .................................... 885/98

(51) Int. Cl.[7] .................................................. H04Q 7/20
(52) U.S. Cl. ............................ 455/435.1; 455/432.1; 455/551; 455/552.1
(58) Field of Search ................................. 455/435, 405, 455/406, 422, 432, 433, 436, 439, 445, 461, 551, 552, 558, 560, 554, 426, 414.1, 414.4, 432.1–432.3, 435.1–435.3, 552.1

(56) References Cited

U.S. PATENT DOCUMENTS

| | | | | |
|---|---|---|---|---|
| 5,454,027 A | * | 9/1995 | Kennedy, III et al. | 455/552 |
| 5,949,770 A | * | 9/1999 | Liu et al. | 455/433 |
| 6,026,291 A | * | 2/2000 | Carlsson et al. | 455/406 |
| 6,094,578 A | * | 7/2000 | Purcell et al. | 455/426 |
| 6,195,558 B1 | * | 2/2001 | Griffith et al. | 455/456 |
| 6,212,372 B1 | * | 4/2001 | Julin | 455/418 |
| 6,539,223 B1 | * | 3/2003 | Bijanki et al. | 455/432 |

FOREIGN PATENT DOCUMENTS

| | | | |
|---|---|---|---|
| GB | 2322998 | * | 9/1998 |
| WO | WO 92/19078 | * | 10/1992 |
| WO | WO 98/10614 | * | 3/1998 |

\* cited by examiner

*Primary Examiner*—Sinh Tran
*Assistant Examiner*—Eliseo Ramos-Feliciano
(74) *Attorney, Agent, or Firm*—Pillsbury Winthrop LLP

(57) ABSTRACT

Telecommunication method which enables a subscriber of a home mobile radio network (HPLMN) to connect to a visited mobile radio network (VPLMN, VPLMN') without a roaming agreement with the home mobile radio network (HPLMN) in that the subscriber is assigned a first mobile subscriber identification (IMSI1) from the number range of his home mobile radio network (HPLMN) and a second IMSI number (IMSI2) from the number range of a partner network (PPLMN), the partner network having additional roaming agreements, and a common call number (MSISDN) being allocated to the two said IMSI numbers (IMSI1, IMSI2). The two IMSI numbers (IMSI1, IMSI2) may preferably be stored on a common or on different identification modules.

11 Claims, 4 Drawing Sheets

ROAMING METHOD AND DEVICES APPROPRIATE THEREFOR

BACKGROUND OF THE INVENTION

1. Field of the Invention

The present invention relates to a roaming method and appurtenant devices. The invention relates in particular to a roaming method and appurtenant devices which are based on the GSM specifications and which are a further development of international roaming.

Roaming is understood to mean the operation of a GSM terminal outside the home network. However, the invention may also be utilized for the problem of roaming between different GSM networks and/or non-GSM networks, for example for roaming between networks working according to different standards such as, e.g., GSM, UMTS, intelligent networks (IN), etc.

2. Related Art

By means of so-called "indirect roaming," an operator of a mobile radio network, that is, a mobile operator, can offer his mobile subscribers blanket coverage without having to set up the whole radio network in his licensed territory. In addition, through "indirect roaming," quick access to worldwide roaming is also made possible.

Patent document WO98/10614, the contents of which are incorporated here by reference, describes a method for "indirect roaming" which enables a subscriber of a home mobile radio network (Home Public Land Mobile Network, HPLMN) to connect to a visited mobile radio network (Visited Public Land Mobile Network, VPLMN) without a roaming agreement with the home mobile radio network (HPLMN), the connection taking place through means, for example an IMSI number (IMSI=International Mobile Subscriber Identity) and a MSISDN number (MSISDN=Mobile Subscriber Integrated Services Digital Network), which are made available by a partner network (Partner Public Land Mobile Network, PPLMN) having a roaming agreement with the home mobile radio network (HPLMN), on the one hand, and with the visited mobile radio network (VPLMN), on the other hand.

In the method described in WO98/10614, each SIM card (SIM=Subscriber Identity Module) of the subscribers of the HPLMN contains two IMSI numbers. Each IMSI number is assigned a different call number (MSISDN). The first IMSI number belongs to the number range of the home mobile radio network (HPLMN), the second to the number range of the partner network PPLMN. In order to log on to a visited network (VPLMN-NR, NR=No Roaming) which has no roaming agreement with the HPLMN, the subscriber can exchange the first IMSI (of the HPLMN) for the second IMSI (of the PPLMN) and is thereby regarded in the visited network (VPLMN) as a subscriber of the partner network (PPLMN).

Since in the method described in WO98/10614, each IMSI is assigned another, differing MSISDN, calls with the first MSISDN for the subscriber must be diverted by means of an extravagant mechanism, in a so-called UBICOM turntable. Subscriber-specific data, for example call diversions, additional numbers, etc., are, moreover, quite conventionally assigned to the IMSI and are thus available only in the home mobile radio network (HPLMN) or in visited mobile radio networks (VPLMN-WR, WR=with roaming) having a roaming agreement with the HPLMN.

Hence an object of the invention is to offer a method and a system which avoid these drawbacks.

SUMMARY OF THE INVENTION

According to the present invention, this goal is achieved especially through the elements of the independent claims. Further advantageous embodiments follow besides from the dependent claims and the description.

In particular, this goal is achieved by the invention in that, in the method according to the invention, which enables a subscriber of a home mobile radio network (Home Public Land Mobile Network, HPLMN) to connect to a visited mobile radio network (Visited Public Land Mobile Network, VPLMN) without a roaming agreement with the home mobile radio network (HPLMN), in that the subscriber receives an identification module having a first mobile subscriber identification (International Mobile Subscriber Identity, IMSI) from the number range of his home mobile radio network (HPLMN) and having a second mobile subscriber identification (IMSI) from the number range of a partner network (Partner Public Land Mobile Network, PPLMN), which partner network (PPLMN) possesses additional roaming agreements, a common call number (Mobile Subscriber Integrated Services Digital Network, MSISDN) is allocated to the two said mobile subscriber identifications (IMSI). The allocation of a common call number (MSISDN) to the different mobile subscriber identifications (IMSI) has the particular advantage that a subscriber can be reached via this one call number (MSISDN) even if he logs on with different mobile subscriber identifications (IMSI) to his home mobile radio network (HPLMN) and to a visited mobile radio network (VPLMN), respectively. The assignment of two (or more) mobile subscriber identifications (IMSI) to a subscriber, one from the number range of the home mobile radio network (HPLMN) and one from the number range of a partner network (PPLMN) has, moreover, the advantage that the subscriber does not depend merely upon the roaming agreements of the operator of the partner network (PPLMN), but that he can additionally profit also by roaming agreements of his home network operator possibly concluded later. As has already been mentioned at the beginning, the invention relates to mobile networks according to the GSM standard; but it may also be utilized in other mobile networks, for instance in UMTS mobile networks (UMTS=Universal Mobile Telephone System), or in particular also for roaming between different GSM and/or non-GSM networks.

In a preferred modification, the identification module activates the second mobile subscriber identification (IMSI) from the number range of a partner network (PPLMN) when it cannot log on to a network with the first mobile subscriber identification (IMSI) from the number range of its home mobile radio network (HPLMN). The activation of an alternate mobile subscriber identification (IMSI) may be initiated in various modifications, which may be implemented as common, situation-dependent modifications or as separate modifications, automatically or by the subscriber, for instance by means of the input means of his terminal.

In various modifications, the first mobile subscriber identification (IMSI)—from the number range of the home mobile radio network (HPLMN)—is (sub-modification a1) filed in the home file (Home Location Register, HLR) of this home mobile radio network, and the second mobile subscriber identification (IMSI)—from the number range of the partner network (PPLMN)—is converted from the first mobile subscriber identification (IMSI), or (sub-modification a2) the first and the second mobile subscriber identification (IMSI) are both filed in the home file (HLR) of the home mobile radio network (HPLMN) and linked to a single call number (MSISDN). Preferably, only one mobile subscriber identification (IMSI) is active at any one time.

Preferably, separate bills are prepared for the respective subscriber for at least certain ones of the at least two mobile subscriber identifications (IMSI) linked to the same call number (MSISDN), whereas a common bill is prepared for the respective subscriber for at least certain others of the at least two mobile subscriber identifications (IMSI) linked to the same call number (MSISDN). This situation-specific billing has the advantage that it is very flexible and that according to the application, and not just in connection with "indirect roaming," separate bills may be prepared for a subscriber for different purposes of use, the mobile subscriber identification (IMSI) corresponding to the purpose and the billing being active in each particular instance, for instance different mobile subscriber identifications (IMSI) for official use and personal use.

The goal of the invention is especially also achieved in that an identification module according to the invention, which is intended for use in a mobile apparatus and makes possible the storage of at least two mobile subscriber identifications (IMSI), contains at least one first mobile subscriber identification (IMSI) from the number range of a home mobile radio network (HPLMN) and a second mobile subscriber identification (IMSI) from the number range of a partner network (PPLMN), the two mobile subscriber identifications (IMSI) being linked to a common call number (MSISDN).

The goal of the invention is especially also achieved in that a programmable device according to the invention having a home file (HLR) in which for every subscriber of a home mobile radio network (HPLMN) contains [sic] at least one mobile subscriber identification (IMSI) and at least one appurtenant call number MSISDN), this home file (HLR) containing for at least certain subscribers a first mobile subscriber identification (IMSI) from the number range of their home mobile radio network (HPLMN), a second mobile subscriber identification (IMSI) from the number range of a partner network (PPLMN), and a call number (MSISDN) assigned to these two mobile subscriber identifications (IMSI) jointly. Preferably in this programmable device, a flag indicates for each subscriber which of the mobile subscriber identifications (IMSI) is active at the moment.

BRIEF DESCRIPTION OF THE DRAWINGS

An embodiment of the present invention is described below by means of an example. The example of the embodiment is illustrated by the following enclosed figures.

DETAILED DESCRIPTION OF PREFERRED EMBODIMENTS

Figure 1:
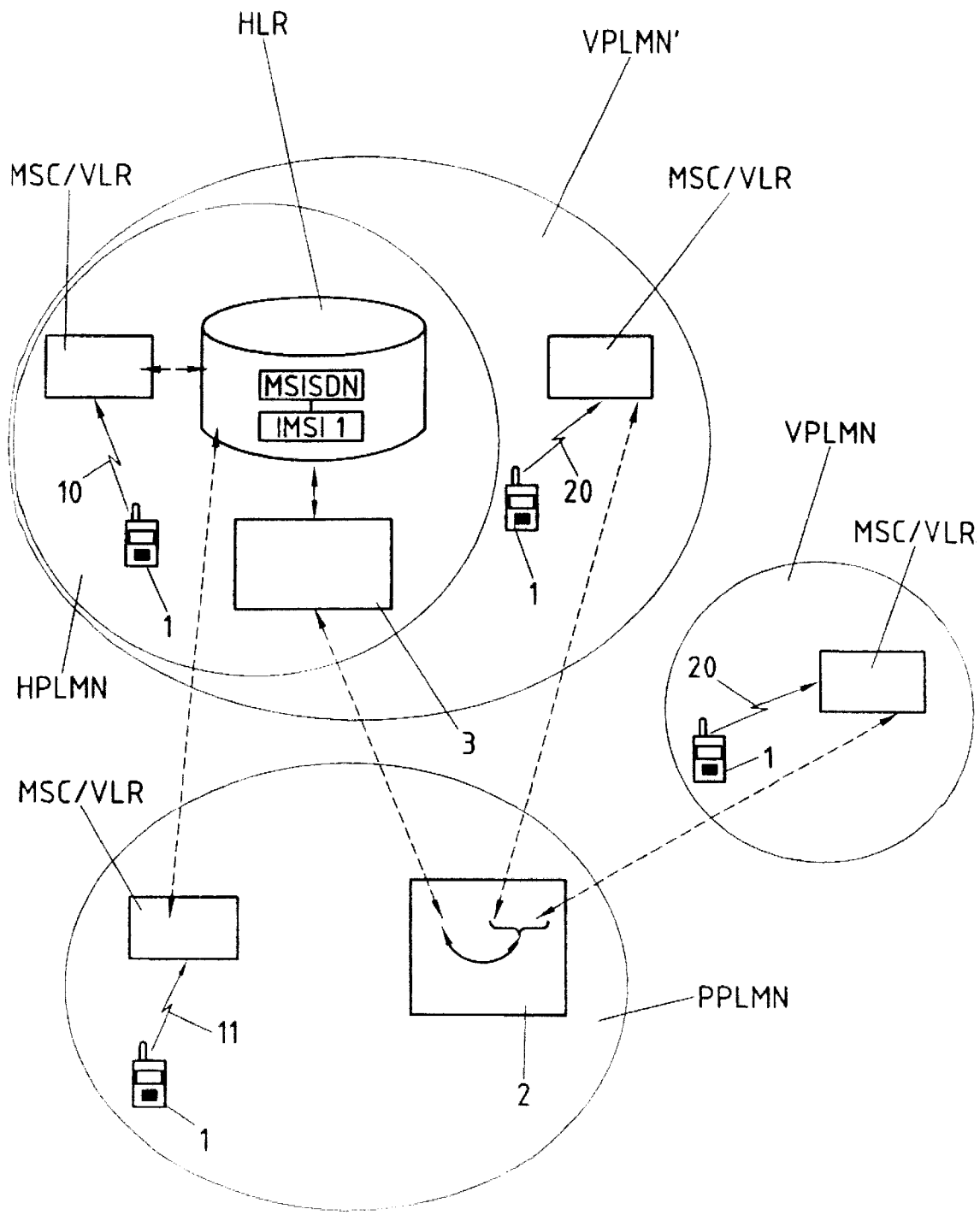
FIG. 1 shows an overall functional diagram which represents diagrammatically the signaling relationships upon check-in according to the modification a1), in which modification one mobile subscriber identification (IMSI) linked to a call number (MSISDN) is registered in the home file (HLR).

According to the present invention, a licensed home mobile network operator (hereafter called lic-operator) sets up and operates in his licensed home mobile radio network territory HPLMN (see FIGS. 1 to 4) one or more Mobile Switching Centre/Home Location Register (MSC/HLR) and a home mobile radio network, for instance a mobile radio network based upon the GSM, UMTS, or other mobile network standard, according to his economic considerations (possibly only in the centers of urban concentration).

The lic-operator of the home mobile radio network area HPLMN makes possible for his customers (subscribers) the operation of mobile terminals 1 in visited mobile radio networks VPLMN, VPLMN' outside their own network through the indirect roaming function. For this purpose, a partner operator of a partner network PPLMN makes his roaming relationships available to the lic-operator.

In international roaming, the mobile subscriber identification according to GSM specifications is based on the IMSI number (IMSI=International Mobile Subscriber Identity= mobile subscriber identification). The partner operator therefore makes available to the lic-operator an IMSI number range from the partner operator number range. The following two modifications shall first be described:

Modification a):

An identification module, for example a SIM card (Subscriber Identity Module), which is removably connected to a mobile terminal 1, contains two IMSI numbers, the first IMSI number IMSI1 from the number range of the lic-operator, the second IMSI number IMSI2 from the number range of the partner operator. A common call number MSISDN (MSISDN number, Mobile Subscriber Integrated Services Digital Network number) is assigned to both IMSI numbers IMSI1, IMSI2. All subscriber-specific data, as for instance call diversions, additional numbers for fax and data transmission, etc., are allocated to the call number MSISDN and are thus always available, independently of the particular IMSI number IMSI1, IMSI2 being used in the network.

The advantage of this preferred modification a) consists in the fact that IMSI numbers IMSI1 of the lic-operator network HPLMN are assigned to the subscribers. A lic-operator can thereby build up his own roaming partner relationships. In addition, upon a possible later cancellation of the indirect roaming, the SIM cards need not be exchanged.

Modification b):

The SIM card contains only one IMSI number IMSI2. It comes from the IMSI number range of the partner operator. A call number MSISDN from the number range of the lic-operator is assigned to this IMSI number IMSI2.

The advantage of this modification b) consists in the fact that it is a simpler solution as regards SIM card, mobile radio terminal 1, and network. Above all as to the possibilities of the further development of the lic-operator, however, modification b) has great drawbacks, especially because parallel to the indirect roaming, the setting-up of direct roaming relationships is not possible. In addition, the SIM cards must be exchanged upon cancellation of the indirect roaming. This modification b) is therefore not described in detail below.

The mobile subscribers of the home mobile radio network territory HPLMN are preferably registered in one or more home files HLR (Home Location Register) of the lic-operator, who thereby also takes over the customer administration.

For the preferred modification a), the following sub-modifications are described for handling the two IMSI numbers IMSI1, IMSI2:

Sub-modification a1), (see FIG. 1):

In the home file HLR of the lic-operator, only the IMSI number IMSI1 of the lic-operator is registered. The appurtenant IMSI number IMSI2 of the partner operator of the partner network PPLMN differs from the IMSI number IMSI1 of the lic-operator only in the Mobile Country Code (MCC), in the Mobile Network Code (MNC), and if need be, in two ($h_1 h_2$) or additional further digits of the Mobile Subscriber Identity Number (MSIN), as shown in the following example:

| Example: | IMSI Number Format | | |
|---|---|---|---|
| | MCC | MNC | MSIN |
| IMSI Number from number range of the lic-operator, IMSI1: | 999 | 07 | 26 24680135 ($h_1 h_2 = 26$) |
| IMSI Number from number range of the partner operator, IMSI2: | 228 | 01 | 37 24680135 ($h_1 h_2 = 37$) |

In the SS7-MAP messages (SS7=signaling system No. 7, MAP=Mobile Application Part) which are transmitted between the partner operator and the lic-operator, the IMSI number IMSI1, IMSI2 is in each case converted in block 3 (see FIG. 1 and FIG. 3, respectively) (IMSI2 from the partner operator into IMSI1 from the lic-operator and vice versa). Block 3 is for instance a programmed software module which is installed and executed for instance in the same computer as the home file HLR of the lic-operator or in any other desired network element suitable therefor. The signaling traffic between the partner network PPLMN and the home mobile radio network HPLMN, and between the partner network PPLMN and the roaming partner network VPLMN, respectively, is diagrammatically represented in FIG. 1 by the broken-line double arrow.

According to the GSM standard, a SIM card is authenticated upon check-in in the network for reasons of security. The authentication relates to the IMSI number. Because only the lic-operator IMSI number IMSI1 is registered in the home file HLR in sub-modification a1), only a single authenticity (Ki key) exists for the two IMSI numbers IMSI1, IMSI2. Therefore, the SIM card in the mobile apparatus 1 must likewise be programmed with a single authenticity (Ki key) for both IMSI numbers IMSI1, IMSI2.

Sub-modification a2), (see FIG. 2):

In the home file HLR of the lic-operator, both IMSI numbers IMSI1, IMSI2 are registered and linked to a common call number MSISDN. Only one of the two IMSI numbers IMSI1, IMSI2 is active at any one time (which is supposed to be suggested in FIG. 2 and in FIG. 4, respectively, by the broken-line block around IMSI2), depending on which network the customer last checked in on. The home file HLR contains for instance a list of mobile subscriber identifications (IMSI numbers) which comprises in addition for each mobile subscriber identification (IMSI number) IMSI1, IMSI2 an active flag which can be set in such a way that only one mobile subscriber identification IMSI1, IMSI2 is considered to be active simultaneously at any one time. For the specialist, there are various methods of marking a mobile subscriber identification IMSI1, IMSI2 as active in the respective list in the home file HLR, for instance this can be undertaken during the location update which is carried out according to the GSM standard when a subscriber concerned checks in with his mobile terminal 1 in a Visitor Location Register MSC/VLR. However, both IMSI numbers IMSI1, IMSI2 also have individual authenticities (Ki keys), whereby sub-modification a2) differs from sub-modification a1) on the SIM card side as well.

At this time, it shall moreover be pointed out that sub-modification a2) may likewise be utilized for other applications, for instance for two SIM cards having a common call number MSISDN or for two IMSI numbers IMSI1, IMSI2 on a single SIM card for distinguishing between different application purposes, such as personal and business calls, for instance. For example, according to the application, a separate bill may be issued for the charging of outgoing calls (originating calls) by a clearing center, not shown, for each, or at least for certain mobile subscriber identification IMSI1, IMSI2 linked to the same call number MSISDN, or a common bill be issued for all, or at least for certain mobile subscriber identification IMSI1, IMSI2 linked to the same call number MSISDN. For this purpose, the clearing center correspondingly assigns several billing addresses to all, or at least to certain mobile subscriber identification IMSI1, IMSI2, or assigns a common billing address to the call number MSISDN, or at least to certain mobile subscriber identifications IMSI1, IMSI2, respectively. For the calculation of the costs, the respective Call Data Records may, for instance, be used as usual.

In all above-specified modifications a1), a2), and b), the home file HLR, as already mentioned, is preferably situated in the network of the lic-operator.

According to GSM specifications, the address of the home file HLR, that is, the HLR address, for the sending of SS7 messages to the home file HLR is derived among other things from the IMSI number (number format CCITT E.212 is converted into CCITT E.214). Because the messages arriving in the partner network PPLMN from the visited networks VPLMN, VPLMN' contain the address of the partner network PPLMN, either the message addresses, that is, the Global Title in the SS7 Signalling Connection Control Part (SCCP) must be converted, or the messages must be forwarded without SCCP routing in the public network, for instance over leased lines or via the Internet, to the home mobile radio network territory HPLMN of the lic-operator. In messages sent from the home file HLR to the visited Visitor Location Register (VLR) MSC/VLR, an HLR address from the number range of the partner network PPLMN must be contained as sender in order to ensure the return of messages. The translation of the SS7 SCCP global title (Global Title) is carried out, as illustrated in FIGS. 1 to 4, in block 2, block 2 being, for instance, a programmed software module which for example is installed and executed in the same computer as the home file (Home Location Register) of the partner network PPLMN or as the Mobile Switching Centre/Visitor Location Register MSC/VLR of the partner network PPLMN or in any other desired network element suitable therefor.

Because SS7 messages for the check-in are routed from the visited networks VPLMN, VPLMN' via partner network PPLMN to the home file HLR of the lic-operator (Location Update), the partner operator has the possibility of checking the IMSI number ranges used by the lic-operator for the indirect roaming.

In modification a) (with sub-modifications a1) and a2)), which work with two IMSI numbers IMSI1, IMSI2, the check-in (Location Update) takes place in dependence on the whereabouts.

Figure 2:
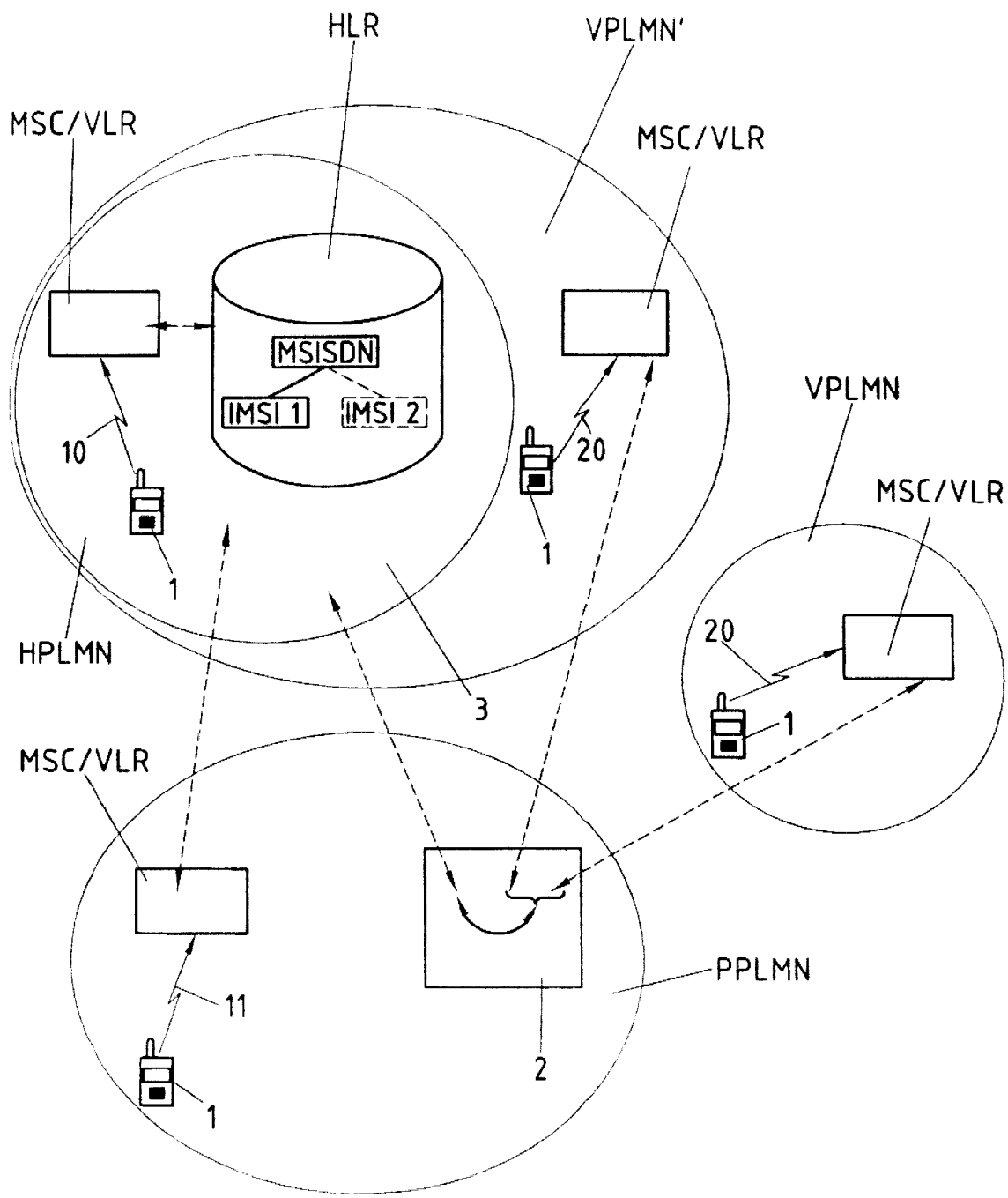
FIG. 2 shows an overall functional diagram which represents diagrammatically the signaling relationships upon check-in according to the modification a2), in which modification two mobile subscriber identifications (IMSI) linked to a common call number (MSISDN) are registered in the home file (HLR).

As long as the mobile subscriber concerned stays in the area covered by the lic-operator, that is, in the home mobile radio network area or in a visited network PPLMN having a direct roaming agreement with the operator of the home mobile radio network HPLMN, the mobile apparatus 1 automatically checks into this network with the IMSI number IMSI1 from the number range of the lic-operator, as is illustrated in FIGS. 1 and 2 by the arrows 10 and 11, respectively. This procedure corresponds to the standardized GSM procedures.

If the mobile subscriber of the lic-operator leaves his own coverage area HPLMN, the subscriber can check automatically or manually into a visited network VPLMN of an operator who has a roaming agreement with the partner operator, as is illustrated in FIGS. 1 and 2 by the arrow 20. According to the desired convenience for the subscriber, for example according to whether the IMSI change is carried out manually or automatically, special functions may be implemented therefor on the SIM card or if necessary also in the mobile apparatus 1. Preferably, the IMSI change takes place by means of a programmed software function, without for instance the SIM card having to be removed from the mobile apparatus 1 or manipulated. The programmed software function preferably runs in the SIM card. However, a programmed software function in the infrastructure of the network may also be preferred. In this latter case, the first or the second IMSI number IMSI1, IMSI2 is activated from the infrastructure of the network by means of special messages which are transmitted to the mobile radio terminal 1 concerned, for instance by means of SMS (SMS=Short Message Services) or USSD messages (USSD= Unstructured Supplementary Services Data).

Figure 3:
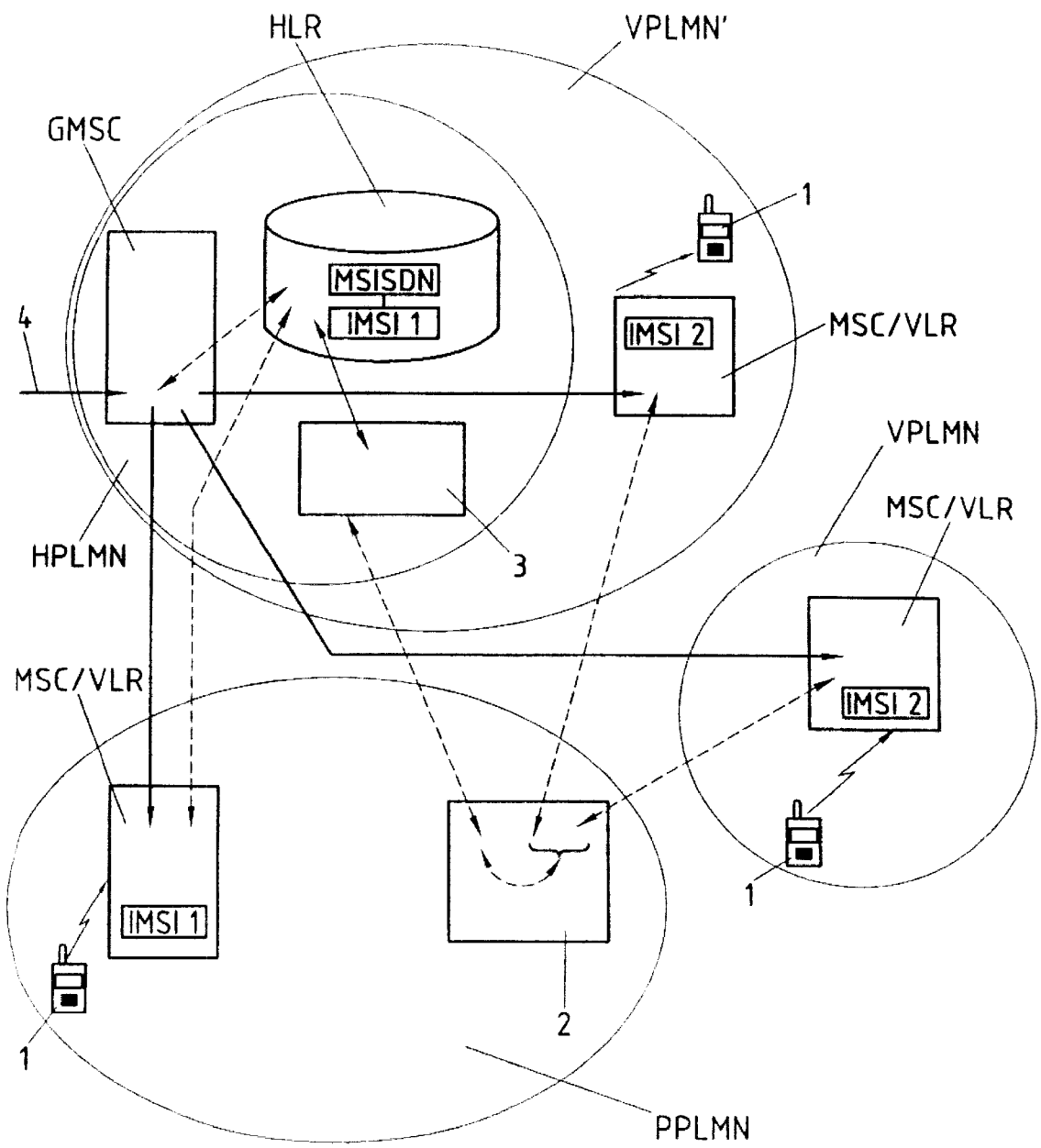
FIG. 3 shows an overall functional diagram which represents diagrammatically the signaling relationships at the time of a terminating connection according to the modification a1), in which modification one mobile subscriber identification (IMSI) linked to a call number (MSISDN) is registered in the home file (HLR).
Figure 4:
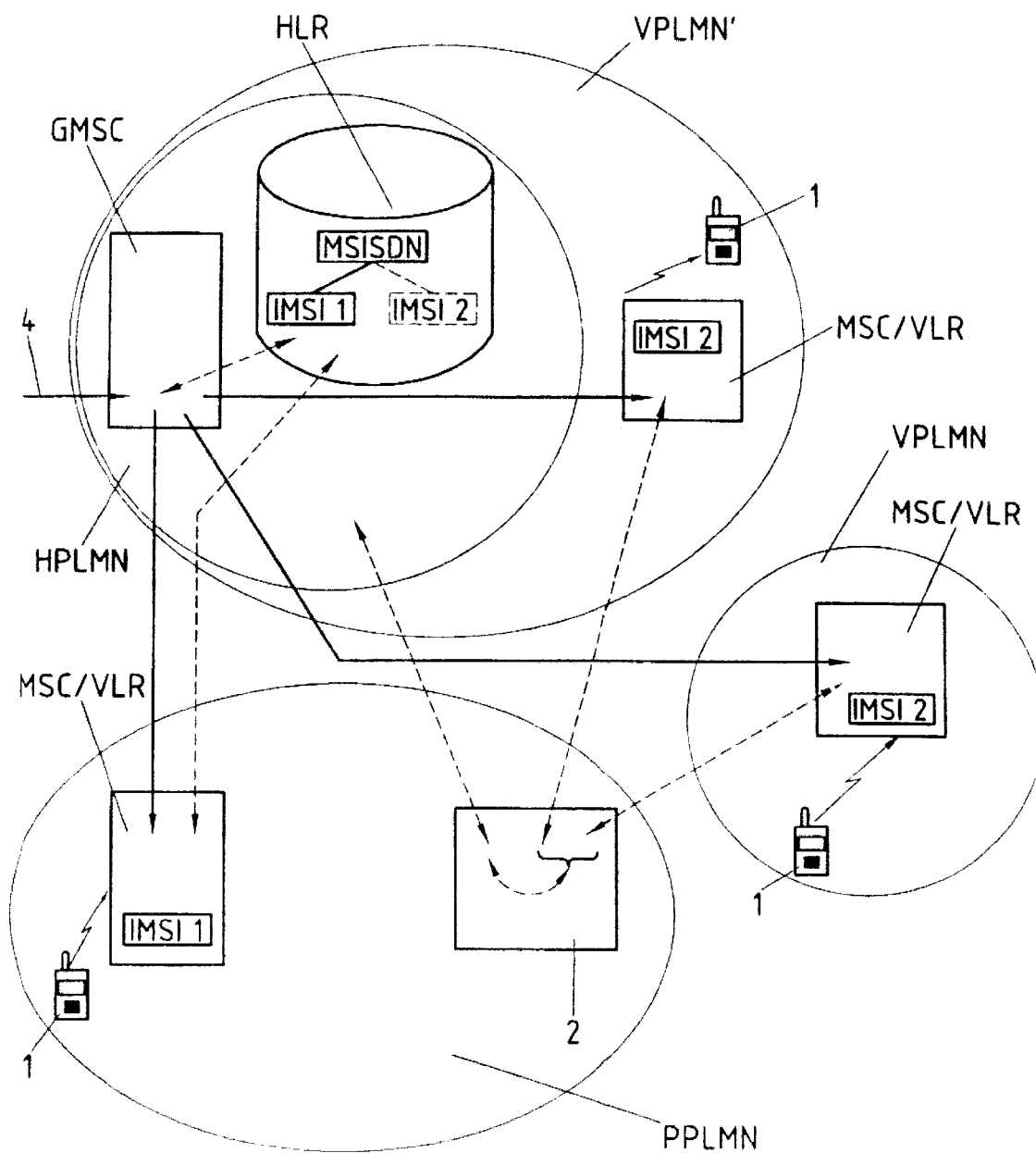
FIG. 4 shows an overall functional diagram which represents diagrammatically the signaling relationships at the time of a terminating connection according to the modification a2), in which modification two mobile subscriber identifications (IMSI) linked to a common call number (MSISDN), are registered in the home file (HLR).

Incoming calls are routed into the network of the lic-operator on the basis of the call number MSISDN which is situated in the number range of the lic-operator. Because the address of the Visitor Location Register (VLR) MSC/VLR in which the subscriber has checked in is registered in the home file HLR of the lic-operator, the sequence of functions (requesting the roaming number and setting up the connection with the roaming number) takes place fundamentally according to GSM specifications. In FIGS. 3 and 4, the signaling relationships for a connection terminating in a mobile radio terminal 1, that is, for a call arriving at a mobile radio terminal 1, is shown diagrammatically in each case for sub-modification a1) and for sub-modification a2), respectively. As an example, the incoming call is illustrated in FIGS. 3 and 4 by the arrow 4, which reaches the home mobile radio network HPLMN via a Gateway Mobile Switching Centre GMSC. In FIGS. 3 and 4, the broken-line double arrows illustrate diagrammatically the signaling for the inquiry for a roaming number (Roaming Number Request), while the solid-line arrows show in a simplified manner the connection setup with the roaming number obtained since, according to the circumstances, routing over other networks may also be connected therewith. In the SS7 MAP messages which are sent to the respective Visitor Location Register MSC/VLR for requesting the roaming number, however, an HLR address from the number range of the partner operator must appear as sender, and the IMSI number of the partner operator must be contained in the MAP message. The FIGS. 3 and 4 illustrate in addition how, through the above-described check-in according to FIGS. 1 and 2, the subscriber concerned is entered with his mobile radio terminal 1 in the partner network PPLMN with the IMSI number IMSI1 from the number range of the lic-operator, and/or in the visited networks VPLMN, VPLMN' with the IMSI number IMSI2 from the number range of the partner operator in the respective Visitor Location Register MSC/VLR.

Some roaming partners ask for a fee for terminating connections as well. The settlements take place via roaming data clearing and finance clearing of the partner operator in the same way as is described below for outgoing connections.

Outgoing calls are treated like "roaming cases" of the partner operator, i.e.,

Call setup according to GSM specification.

Settlement via roaming data and finance clearing of the partner operator.

The charging-back and the data clearing of these connections to the lic-operator take place by means of a separate clearing through the partner operator.

Terminating short messages (Short Messages) are delivered according to GSM specifications on the basis of the address registered in the home file HLR of the Visitor Location Register concerned, that is, the VLR address and the IMSI number. The SS7 message sent to the Visitor Location Register MSC/VLR must contain as sender an IMSI number IMSI2 from the number range of the partner operator, and the IMSI number IMSI2 of the partner operator must be contained in the MAP message. Short messages (Short Messages) produced are sent according to GSM specifications to the short-message service center (Short Message Service Centre, SMSC) of the lic-operator and/or to other SMSCs.

In countries or covered areas, respectively, in which the lic-operator has direct roaming agreements with other mobile operators (home mobile radio network area HPLMN or partner network PPLMN and/or visited network with roaming agreement), roaming with the IMSI number IMSI1 from the number range of the lic-operator functions according to GSM specifications.

In countries, or in areas, respectively, in which no visited network VPLMN, VPLMN' has a direct roaming agreement with the home network HPLMN, the subscriber can check into a roaming network VPLMN, VPLMN' of the partner automatically or manually with the partner-IMSI IMSI2.

The settlement of these roaming connections takes place via roaming data clearing and finance clearing of the partner operator with corresponding charging-back to the lic-operator via data clearing.

Legend of the Reference Characters

1. Mobile radio apparatus.
2. Translation of the SS7 SCCP global title (Global Title).
3. Conversion of the IMSI of the lic-operator (IMSI1) into the IMSI of the partner operator (IMSI2) and vice versa.
4. Call with Mobile Subscriber Integrated Services Digital Network number (MSISDN) from the number range of the lic-operator.
10. Check-in with IMSI of the lic-operator (IMSI1).
11. Check-in with IMSI of the lic-operator (IMSI1), (conventional international roaming).
20. Check-in with IMSI of the partner operator (IMSI2).
GMSC Gateway Mobile Switching Centre.
HLR Home file (Home Location Register).
HPLMN Home mobile radio network area of the lic-operator or lic-operator network (Home Public Land Mobile Network).

IMSI1 International Mobile Subscriber Identity Number from number range of the lic-operator.

IMSI2 International Mobile Subscriber Identity Number from the number range of the partner operator.

MSC/VLR Mobile Switching Centre/Visitor Location Register. MSISDN Mobile Subscriber Integrated Services Digital Network number of the lic-operator.

PPLMN Partner network ("indirect roaming" provider), (Partner Public Land Mobile Network).

VPLMN Visited network of a roaming partner of the partner operator (worldwide), (Visited Public Land Mobile Network). VPLMN' Visited network in the country of the lic-operator (Visited Public Land Mobile Network).

What is claimed is:

1. Telecommunication method which enables a subscriber of a home mobile radio network to connect to a visited mobile radio network without a roaming agreement with the home mobile radio network in that a subscriber is assigned a first mobile subscriber identification from the number range of his home mobile radio network and a second mobile subscriber identification from the number range of a partner network, the partner network having additional roaming agreements, the method comprising:

filing said first mobile subscriber identification in the home file of the home mobile radio network;

computing said second mobile subscriber identification from the first mobile subscriber identification contained in a first signaling message transmitted from the home mobile radio network to the partner network and replacing in said first signaling message the first mobile subscriber identification with the computed second mobile subscriber identification, and computing said first mobile subscriber identification from the second mobile subscriber identification contained in a second signaling message transmitted from the partner network to the home mobile radio network and replacing in said second signaling message the second mobile subscriber identification with the computed first mobile subscriber identification, said second mobile subscriber identification having the same format as the first mobile subscriber identification; and allocating a common call number to the two said mobile subscriber identifications.

2. Telecommunication method according to claim 1, wherein at least certain ones of said first and second mobile subscriber identifications linked to a common call number are stored on a common identification module.

3. Telecommunication method according to claim 2, wherein said identification module activates the second mobile subscriber identification when it cannot log on to a network with the first said mobile subscriber identification.

4. Telecommunication method according to claim 2, wherein said at least certain ones of said first and second mobile subscriber identification can be activated by the subscriber with input means of a terminal.

5. Telecommunication method according to claim 2, wherein common identification module is programmed with a single authenticity key for the two said mobile subscriber identifications, which authenticity key is used for authentication of the identification module upon checking into a mobile radio network.

6. Telecommunication method according to claim 1, wherein for at least certain ones of said first and second mobile subscriber identifications linked to a common call number separate bills are issued to the subscriber concerned.

7. Telecommunication method according to claim 1, wherein for at least certain ones of said first and second mobile subscriber identifications linked to a common call number a common bill is issued to the subscriber concerned.

8. Telecommunication method according to claim 1, wherein said mobile radio networks are GSM networks.

9. Telecommunication method according to claim 1, wherein, in signalling traffic between the partner network and the home mobile radio network, said first mobile subscriber identification is computed into said second mobile subscriber identification, or respectively said second mobile subscriber identification is computed into said first mobile subscriber identification, when the subscriber is checked into a visited mobile radio network with the second mobile subscriber identification, which visited mobile radio network has a roaming agreement with the partner network.

10. Telecommunication method according to claim 1, wherein during computation of said second mobile subscriber identification from the first mobile subscriber identification, at least a mobile country code and a mobile network code of the first mobile subscriber identification are replaced with values from the number range of the partner network.

11. Telecommunication method according to claim 1, wherein said first mobile subscriber identification comprises a first mobile subscriber identity number, said second mobile subscriber identification comprises a second mobile subscriber identity number and said second mobile subscriber identity number is computed from said first mobile subscriber identity number.

* * * * *

UNITED STATES PATENT AND TRADEMARK OFFICE
CERTIFICATE OF CORRECTION

PATENT NO. : 6,738,622 B1
DATED : May 18, 2004
INVENTOR(S) : Stadelmann et al.

It is certified that error appears in the above-identified patent and that said Letters Patent is hereby corrected as shown below:

Title page,
Item [73], Assignee, should read, -- Swisscom Mobile AG, Bern (CH) --.

Signed and Sealed this

Thirteenth Day of September, 2005

JON W. DUDAS
*Director of the United States Patent and Trademark Office*